US008451134B2

(12) United States Patent
Bharadwaj et al.

(10) Patent No.: US 8,451,134 B2
(45) Date of Patent: May 28, 2013

(54) WIND TURBINE GENERATOR FAULT DIAGNOSTIC AND PROGNOSTIC DEVICE AND METHOD

(75) Inventors: Raj Mohan Bharadwaj, Maple Grove, MN (US); Kyusung Kim, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 358 days.

(21) Appl. No.: 12/841,268

(22) Filed: Jul. 22, 2010

(65) Prior Publication Data

US 2011/0018727 A1 Jan. 27, 2011

Related U.S. Application Data

(60) Provisional application No. 61/228,320, filed on Jul. 24, 2009.

(51) Int. Cl.
*G08B 21/00* (2006.01)
(52) U.S. Cl.
USPC .......... 340/648; 340/3.43; 702/182; 702/185; 290/44

(58) Field of Classification Search
USPC ................. 340/648, 657, 660, 661, 664, 683, 340/3.43, 3.44, 679; 702/179, 184, 57, 58, 702/182, 185, 189, 190, FOR. 113; 290/44; 416/61; 700/90
See application file for complete search history.

(56) References Cited

U.S. PATENT DOCUMENTS 7,822,560 B2 * 10/2010 LeMieux ........................ 702/34
8,230,266 B2 * 7/2012 Hamby et al. .................. 714/39

* cited by examiner

*Primary Examiner* — Toan N Pham
(74) *Attorney, Agent, or Firm* — Schwegman, Lundberg & Woessner, P.A.

(57) ABSTRACT

A computer implemented method and system includes using information provided from sensors to monitor a wind turbine generator and provide signals representative of operation of the wind turbine generator, extracting signal level features from the signals, extracting model based features from the signals, calculating signal based conclusions, model based conclusions and spectral feature reinforcement based conclusions, and fusing the conclusions to provide a fault detection indication.

20 Claims, 4 Drawing Sheets

WIND TURBINE GENERATOR FAULT DIAGNOSTIC AND PROGNOSTIC DEVICE AND METHOD

RELATED APPLICATION

This application claims priority to U.S. Provisional Application Ser. No. 61/228,320 (entitled WIND TURBINE GENERATOR FAULT DIAGNOSTIC AND PROGNOSTIC DEVICE AND METHOD, filed Jul. 24, 2009) which is incorporated herein by reference.

BACKGROUND

Unscheduled generator failure is a major contributor to wind turbine down time. While monitoring the condition of an induction generator is similar to that of an induction motor, generator current may be governed by an external load. It is thus, difficult to apply monitors designed for induction motors to determine electrical and mechanical faults that may occur.

DETAILED DESCRIPTION

Figure 1:
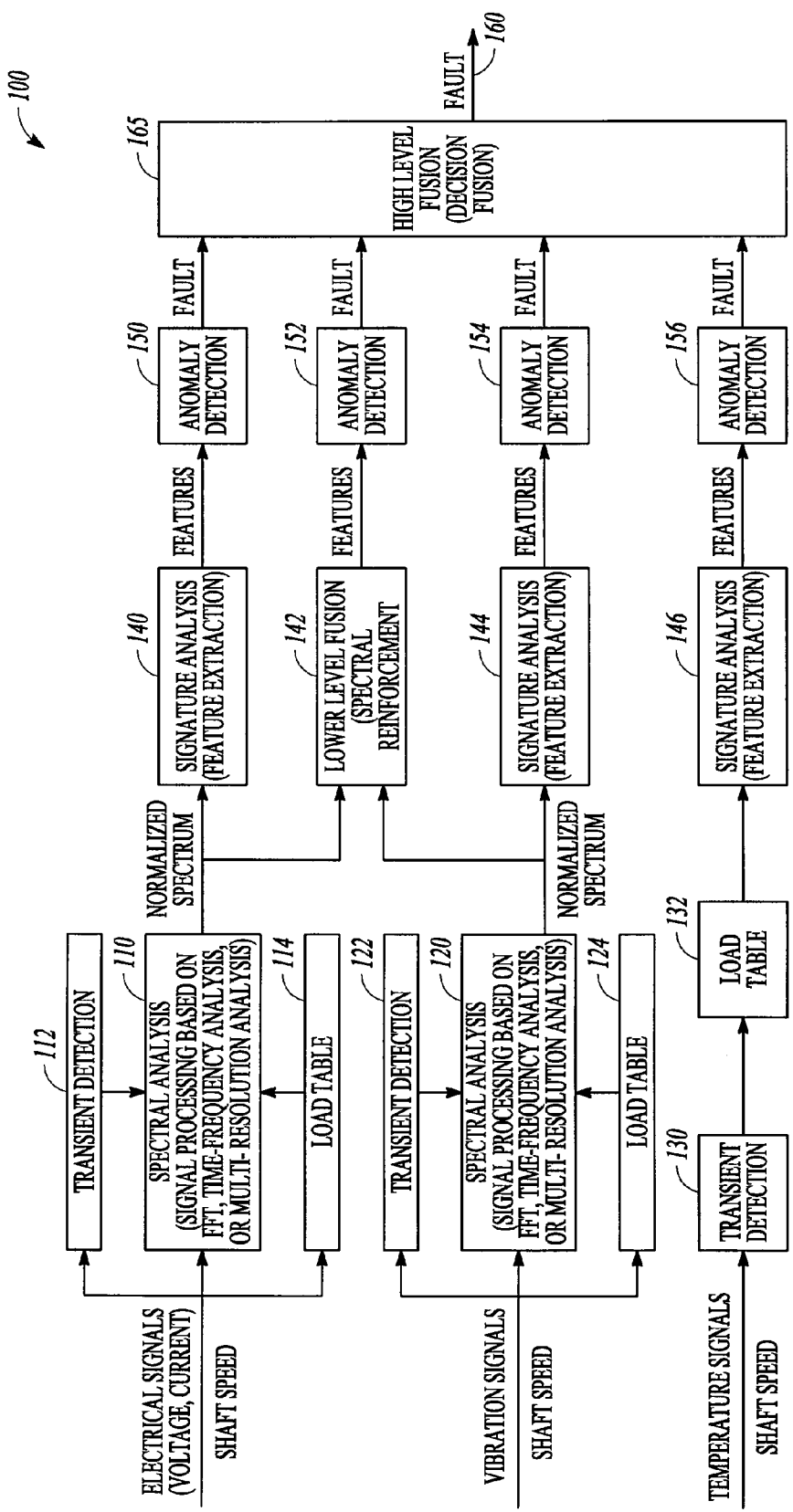
FIG. 1 is a block flow diagram illustrating extraction of signal level features according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A hybrid approach to wind turbine generator fault diagnostics and prognostics utilizes a model and spectral signature analysis based methods of fault detection, along with advanced trending to generate a generator prognostics indicator. This approach for condition monitoring for a wind turbine induction generator system covers both electrical and mechanical faults.

Wind turbine generator current is governed by external loads. In one embodiment, both signature and model based methods are used to provide coverage for electrical and mechanical faults via a computer implemented diagnostics system. Data collected from generator terminal currents and voltages, vibration signals from the generator bearing accelerometers, and thermocouples monitoring of critical bearings, generator exciter, and the generator windings are sensed progressively and transformed into information. The information is processed to determine a system level health indicator.

Within this construct, the presence of multiple sensors; various sensing modalities along with known physics of failure or mechanistic models are exploited to calculate heal indicators for an actuator system. For example, in the case of generator eccentricity information redundancy may be exploited by using one or both of a bearing accelerometer signal and generator voltage signature to detect an underlying fault. The use of multiple sensor modalities improves the detection accuracy and false alarm rate of the diagnostics system. The monitored condition indicators may be further trended to generate information to support the overall wind turbine prognostics.

FIG. 1 is a flow diagram 100 illustrating extraction of signal level features. At spectral analysis module 110, electrical signals including voltage and current are received. Shaft speed may also be provided. The spectral analysis module includes signal processing may be based on fast Fourier transforms, time frequency analysis, or multimodal resolution analysis, or combinations thereof to provide a normalized spectrum. The electrical signals may also be provided to a transient detection module 112 and a load table 114 to aid in the spectral analysis.

Vibration signals along with shaft speed are provided to a further spectral analysis module 120. The spectral analysis module includes signal processing may be based on fast Fourier transforms, time frequency analysis, or multimodal resolution analysis, or combinations thereof to provide a normalized spectrum. The electrical signals may also be provided to a transient detection module 112 and a load table 114 to aid in the spectral analysis.

Temperature signals along with shaft speed are provided to a transient detection module 130 and load table 132. The normalized spectrum of electrical signals is provided to a signature analysis module 140 for feature extraction, and to a lower level function module 142 for providing spectral reinforcement. The normalized spectrum based on the vibration signals is also provided to the lower level function module 142 as well as a signature analysis module 144 for feature extraction. Temperature signals are analyzed in a spectral analysis module 146 for feature extraction.

Each of the modules 140, 142, 144, and 146 are respectively coupled to anomaly detection modules 150, 152, 154, and 156, which identify faults from the signals collected. Note that anomaly detector 150 detects faults as a function of the electrical signals, detector 152 detects faults based on both the electrical signals and the vibration signals, detector 154 operates on the vibration signals, and detector 156 on the temperature signals. The identified faults by the detectors are provided to a higher level fusion module 160, which performs decision fusion and provides actual notices of faults and trends.

In one embodiment, higher level fusion is the fusion of all the diagnostics/anomaly detection outputs from 150, 152, 154 and 156. Probabilistic, heuristics and knowledge-based methods of fusion are used to fuse the inputs from different anomaly detection schemes.

The extraction of features is commonly performed for induction motors. Many of the same analysis techniques may be used for induction generators, with a major difference being that the induction generator may be governed by an external load.

Figure 2:
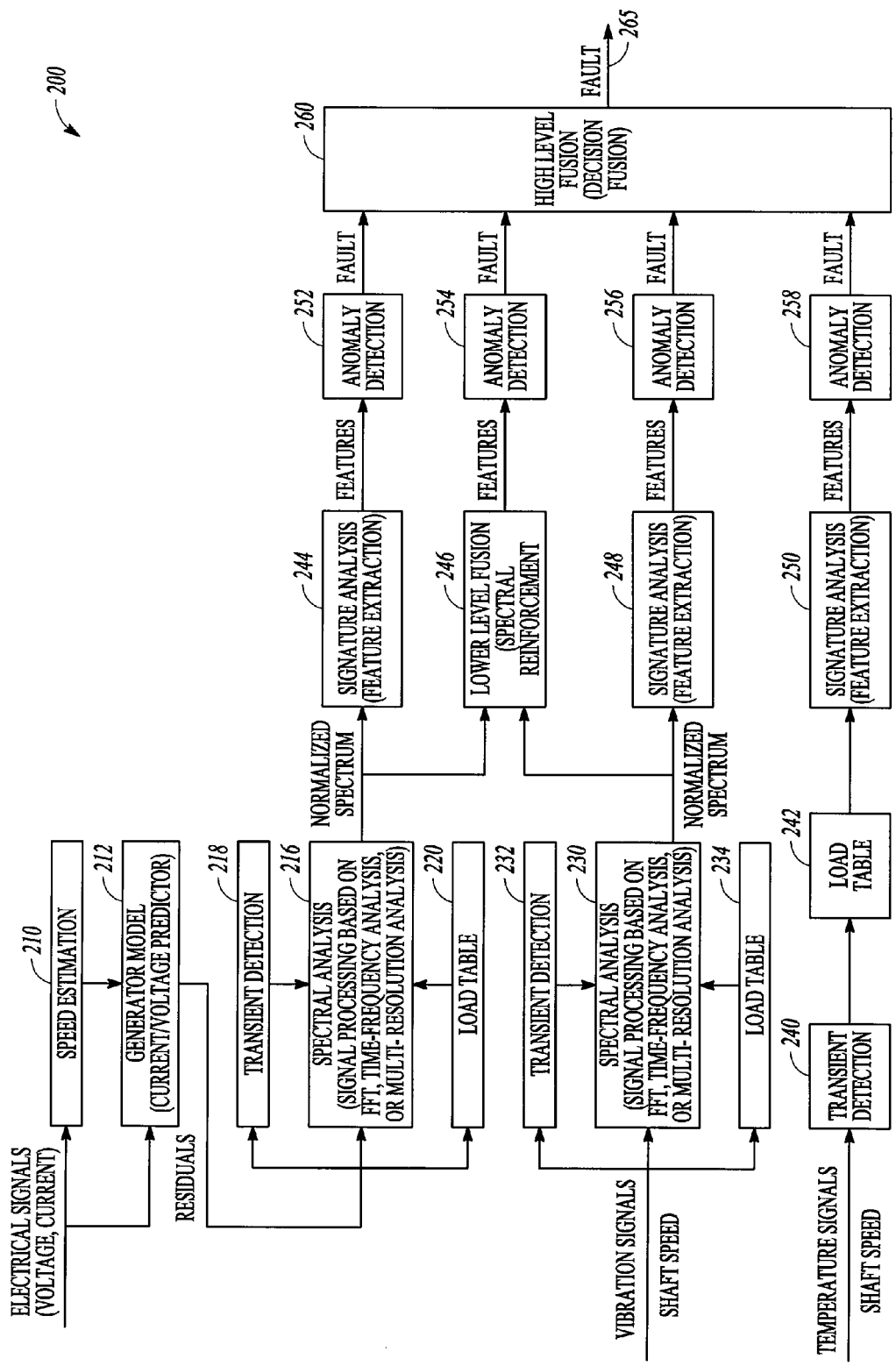
FIG. 2 is a block flow diagram illustrating extraction of model based features according to an example embodiment.

FIG. 2 is a flow diagram illustrating extraction of model based features generally at 200. A speed extraction module 210 receives electrical signals representative of voltage and current of the electrical generator. A generator model 212 is receives information from the speed extraction module 210 and the electrical signals and operates as a current/voltage predictor. Residual information from the generator model 212 is provided to a spectral analysis module 216. The spectral analysis module 216 includes signal processing based on fast Fourier transforms, time frequency analysis, or multimodal resolution analysis, or combinations thereof to provide a normalized spectrum. The electrical signals may also be provided to a transient detection module 218 and a load module 220 to aid in the spectral analysis.

Vibration signals along with shaft speed are provided to a further spectral analysis module 230. The spectral analysis module includes signal processing may be based on fast Fourier transforms, time frequency analysis, or multimodal resolution analysis, or combinations thereof to provide a normalized spectrum. The electrical signals may also be provided to a transient detection module 232 and a load model 234 to aid in the spectral analysis.

Temperature signals along with shaft speed are provided to a transient detection module 240 and load model 242. The normalized spectrum of electrical signals is provided to a signature analysis module 244 for feature extraction, and to a lower level function module 246 for providing spectral reinforcement. The normalized spectrum based on the vibration signals is also provided to the lower level function module 246 as well as a signature analysis module 248 for feature extraction. Temperature signals are analyzed in a spectral analysis module 250 for feature extraction.

Each of the modules 244, 246, 248, and 250 are respectively coupled to anomaly detection modules 252, 254, 256, and 258, which identify faults from the signals collected. Note that anomaly detector 252 detects faults as a function of the electrical signals, detector 254 detects faults based on both the electrical signals and the vibration signals, detector 256 operates on the vibration signals, and detector 258 on the temperature signals. The identified faults by the detectors are provided to a higher level fusion module 260, which performs decision fusion and provides actual notices of faults and trends at 265.

Figure 3:
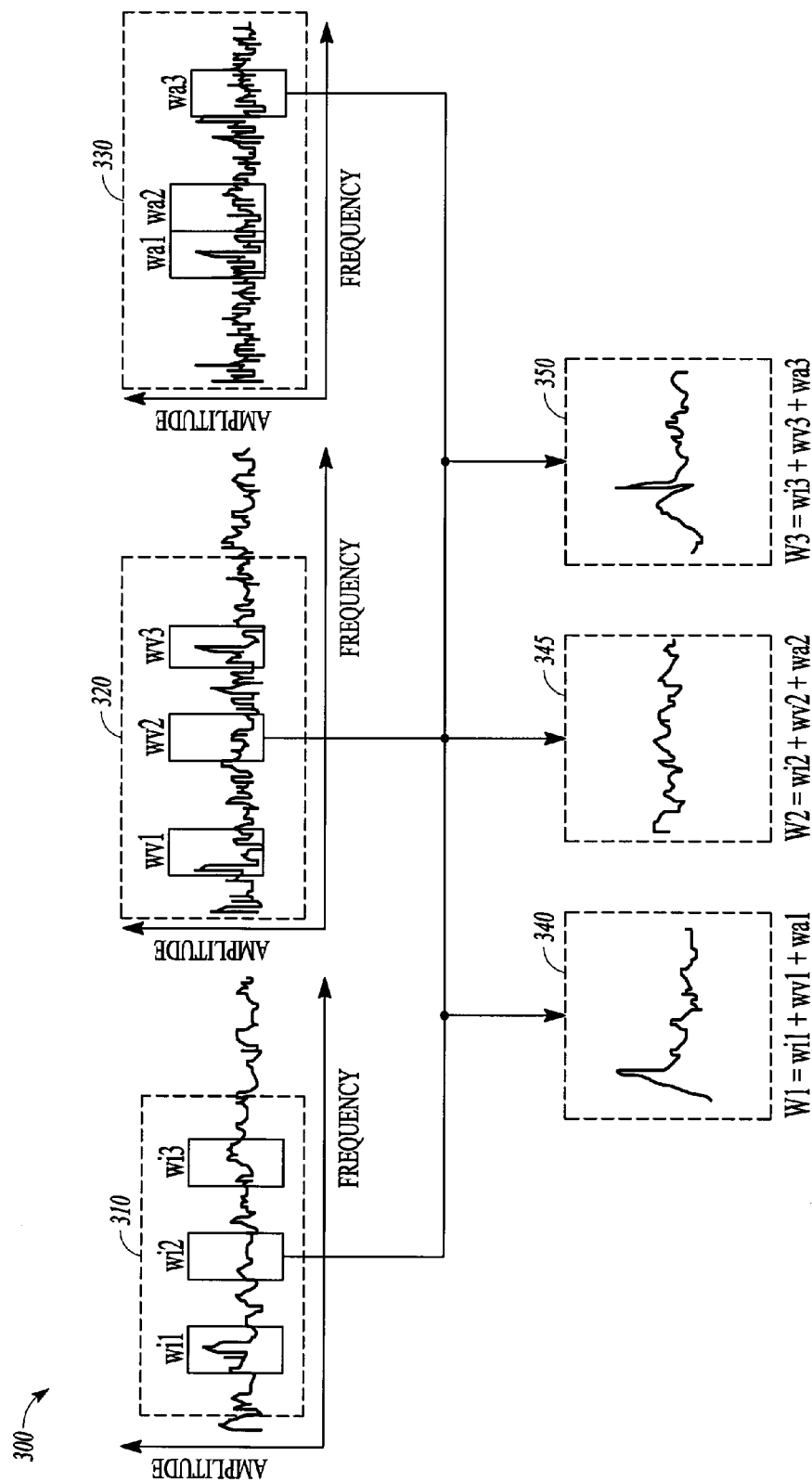
FIG. 3 is a block flow diagram illustration low level fusion for fault detection according to an example embodiment.

Low level fusion is then performed for fault detection as illustrated in block form at 300 in FIG. 3. The low level fusion is performed using the signal based conclusions, model based conclusions and spectral feature reinforcement based conclusions provided by the procedures identified at 142 in FIGS. 1 and 246 in FIG. 2 in one embodiment. The generator, bearing technical data is read, including the number of poles, type of bearing, gears, etc. A spectrum of generator current, voltage, and vibration data is computed. The generator speed and load is then measured or estimated. The spectrum is the normalized using the estimated load for a number of features $W_1$, $W_2$, and $W_3$. Many more features may be handled in further embodiments, but for simplicity of description, three are used as an example.

At 310, the normalized current spectrum for each of the features is illustrated as $Wi_1$, $Wi_2$, and $Wi_3$. Similarly, at 320, normalized voltage spectrum information is represented as $Wv_1$, $Wv_2$, and $Wv_3$. Normalized vibration spectrum is illustrated at 330 as $Wa_1$, $Wa_2$, and $Wa_3$. Each of the normalized values are respectively combined at 340, where $W_1=Wi_1+Wv_1+Wa_1$, at 345, $W_2=Wi_2+Wv_2+Wa_2$, and at 350, where $W_3=Wi_3+Wv_3+Wa_3$. Signals may be routed via direct connections, or via a bus.

Using physical knowledge of the generator, windows of normalized spectral information are extracted from each of the current, voltage, and vibration spectrum. Knowledge based transforms are then used to combine, such as by adding the information together. Since evidence from these multi-modality sensors are collaborative, the spectral signal natures of true/present faults are enhanced, whereas those due to un-modeled dynamics and false alarms will be cancelled. Diagnostics may then be finalized based on detection from the reinforced spectral signature. Trend signatures over time along with the normalized failure peak strengths are used to estimate the fault progression for prognostics health management.

Figure 4:
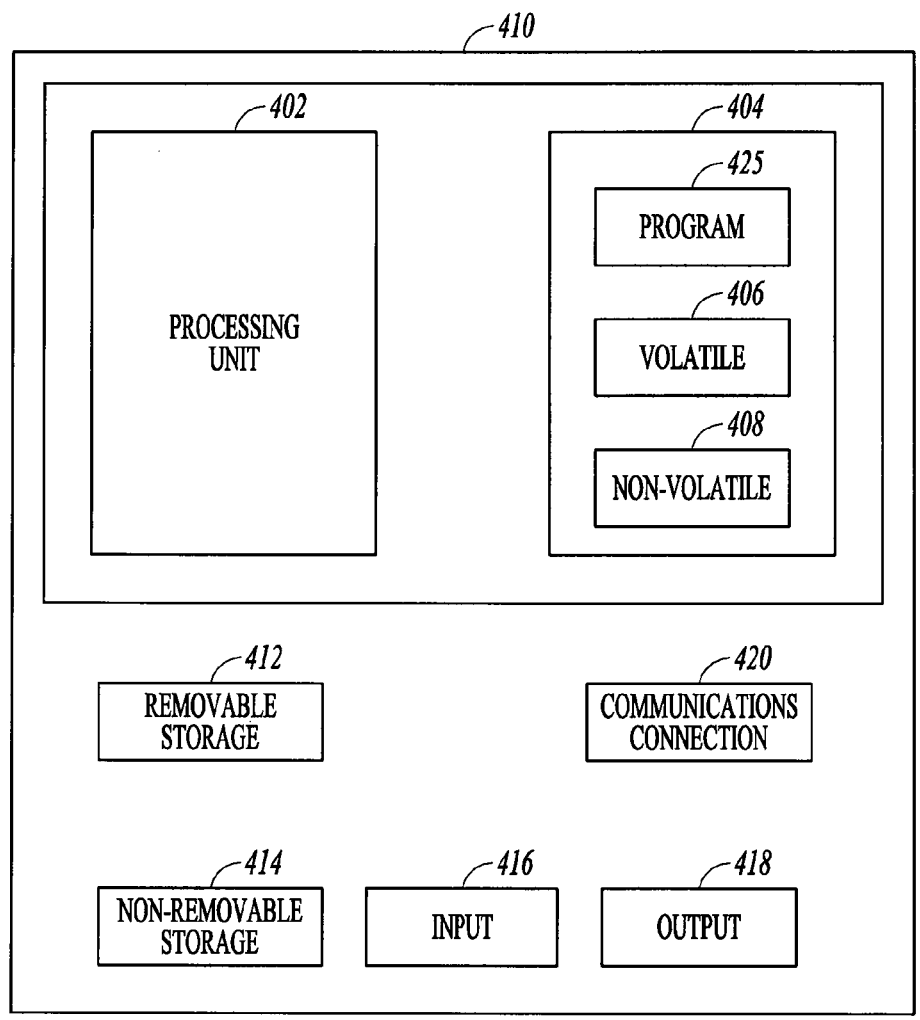
FIG. 4 is a block diagram of a computer system that executes programming for performing methods and procedures regarding extraction and fusion according to an example embodiment.

A block diagram of a computer system that executes programming for performing the above algorithms of the diagnostics system is shown in FIG. 4. A general computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium.

The Abstract is provided to comply with 37 C.F.R. §1.72(b) is submitted with the understanding that it will not be used to interpret or limit the scope or meaning of the claims.

The invention claimed is:
1. A computer implemented method comprising:
using multiple sensors to monitor a wind turbine generator and provide signals representative of operation of the wind turbine generator;
extracting signal level features from the signals;
extracting model based features from the signals;

calculating signal based conclusions, model based conclusions and spectral feature reinforcement based conclusions; and fusing the conclusions to provide a fault detection indication.

2. The method of claim 1 wherein the signals representative of operation of the wind turbine generator comprise spectrum information of generator current, voltage and vibration.

3. The method of claim 2 wherein calculating conclusions comprises:
normalizing the spectrum information; and
extracting windows of normalized spectral information from each of current, voltage and vibration spectrum.

4. The method of claim 3 wherein fusing the conclusions comprises:
combining the normalized windowed spectral information to provide spectral signatures of faults; and
finalizing diagnostics based on detection from the spectral signatures.

5. The method of claim 4 and further comprising trending the spectral signatures over time along with normalized failure peak strengths to provide an estimate of fault progression.

6. The method of claim 1 wherein spectrum information is generated by at least one of fast Fourier transforms, time frequency analysis, and multimodal resolution analysis.

7. The method of claim 1 and further comprising receiving wind generator shaft speed information for use in fusing the conclusions.

8. The method of claim 1 and further comprising receiving temperature information for use in fusing the conclusions.

9. The method of claim 1 wherein fusing the conclusions comprises adding normalized values for voltage spectrum information, current spectrum information, and vibration spectrum information using a knowledge based transform.

10. A non-transitory computer readable storage device having instructions stored thereon to cause a computer system to implement a method, the method comprising:
using multiple sensors to monitor a wind turbine generator and provide signals representative of operation of the wind turbine generator;
extracting signal level features from the signals;
extracting model based features from the signals;
calculating signal based conclusions, model based conclusions and spectral feature reinforcement based conclusions; and
fusing the conclusions to provide a fault detection indication.

11. The non-transitory computer readable storage device of claim 10 wherein the signals representative of operation of the wind turbine generator comprise spectrum information of generator current, voltage and vibration.

12. The non-transitory computer readable storage device of claim 11 wherein calculating conclusions comprises:
normalizing the spectrum information; and
extracting windows of normalized spectral information from each of current, voltage and vibration spectrum.

13. The non-transitory computer readable storage device of claim 12 wherein fusing the conclusions comprises:
combining the normalized windowed spectral information to provide spectral signatures of faults; and
finalizing diagnostics based on detection from the spectral signatures.

14. The non-transitory computer readable storage device of claim 13 and further comprising trending the spectral signatures over time along with normalized failure peak strengths to provide an estimate of fault progression.

15. The non-transitory computer readable storage device of claim 10 wherein spectrum information is generated by at least one of fast Fourier transforms, time frequency analysis, and multimodal resolution analysis.

16. The non-transitory computer readable storage device of claim 10 and further comprising receiving wind generator shaft speed information for use in fusing the conclusions.

17. The non-transitory computer readable storage device of claim 10 and further comprising receiving temperature information for use in fusing the conclusions.

18. The non-transitory computer readable storage device of claim 10 wherein fusing the conclusions comprises adding normalized values for voltage spectrum information, current spectrum information, and vibration spectrum information using a knowledge based transform.

19. A system comprising:
a module to receive multiple sensors to monitor a wind turbine generator and provide signals representative of operation of the wind turbine generator;
a module to extract signal level features from the signals;
a module to extract model based features from the signals;
a module to calculate signal based conclusions, model based conclusions and spectral feature reinforcement based conclusions; and
a module to fuse the conclusions to provide a fault detection indication.

20. The system of claim 19 and further comprising:
a module to receive wind generator shaft speed information;
a module to receive temperature information;
a module to provide feature extraction from the signal level features comprising voltage and current;
a module to provide feature extraction from the signal level features comprising vibration signals; and
a module to provide feature extraction from a combination of voltage, current, and vibration, wherein the shaft speed information and temperature information are used by the module to fuse the conclusions to provide the fault detection indication.

* * * * *